Sept. 28, 1948.  E. P. HAROLD  2,450,042
ANTISKID CHAIN
Filed March 3, 1947  2 Sheets-Sheet 1
Fig. 1.
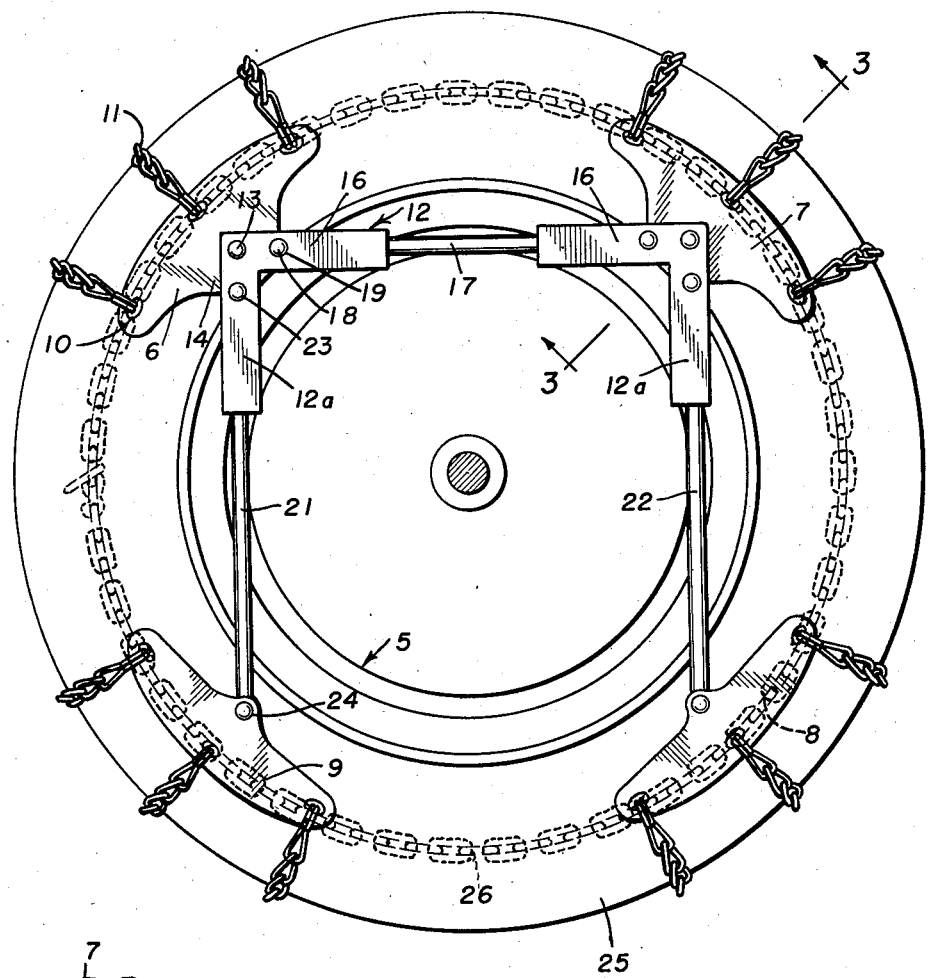
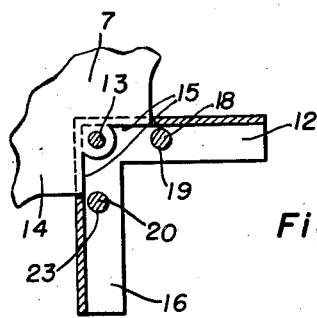
Fig. 5.
Inventor
Edwin P. Harold
By *Clarence A. O'Brien
and Harvey B. Jacobson*
Attorneys Sept. 28, 1948.   E. P. HAROLD   2,450,042
ANTISKID CHAIN
Filed March 3, 1947   2 Sheets-Sheet 2
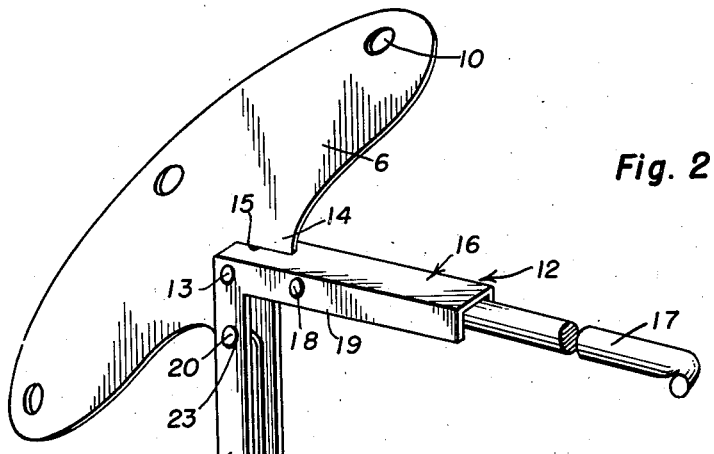
Fig. 2.
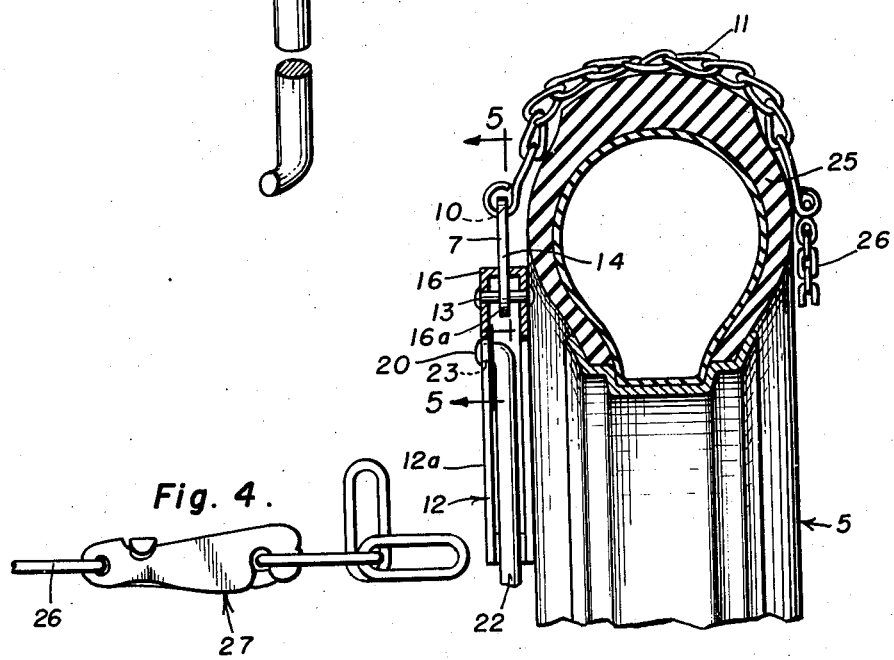
Fig. 3.
Fig. 4.
Inventor
Edwin P. Harold
By *Clarence A. O'Brien*
and *Harvey B. Jacobson*
Attorneys Patented Sept. 28, 1948

2,450,042

UNITED STATES PATENT OFFICE 2,450,042

ANTISKID CHAIN

Edwin P. Harold, Menasha, Wis.

Application March 3, 1947, Serial No. 732,079

3 Claims. (Cl. 152—241)

This invention relates to new and useful improvements in anti-skid chains and the primary object of the present invention is to provide a device of the character referred to that can quickly and easily be applied to a vehicle wheel without jacking up the said wheel.

Another important object of the present invention is to provide an anti-skid device for vehicle tires including a single locking mechanism placed on the outer side of the tire for conveniently locking the device to the wheel without having to reach in back of the wheel.

A further object of the present invention is to provide a collapsible anti-skid device adapted for use on buses and trucks as well as passenger cars.

A still further object of the present invention is to provide an anti-skid device of the class described that is simple and practical in construction, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the improved anti-skid chain applied to the inner side of a usual vehicle wheel.

Figure 2 is a perspective view of one of the chain receiving plates and part of the collapsible frame for connecting the plate to other similar plates.

Figure 3 is an enlarged sectional view taken on line 3—3 of Figure 1.

Figure 4 is a side elevational view of a usual tire chain hook used in this invention.

Figure 5 is a sectional view taken on line 5—5 of Figure 3.

Referring now to the drawings in detail, wherein for the purpose of illustration, I have disclosed a preferred embodiment of the present invention. On the inside of the wheel 5, as shown in Figure 1, I provide substantially T-shaped chain receiving plates 6, 7, 8 and 9. Each of these plates are provided with openings 10 into which hooks on the ends of groups of cross links 11 are secured.

Substantially L-shaped channel members designated generally by the numeral 12 are pivotally secured by a rivet or the like 13 to the lower portion 14 of plates 6 and 7 with the inner edge portion of said respective plates extending in slots 15 provided in the corners of members 12.

A connecting rod 17 has its ends 18 turned outwardly to pivotally engage openings 19 in one leg 16 of member 12 whereby plates 6 and 7 are held in spaced apart relation to each other.

The outwardly turned ends 20 of a pair of elongated plate connecting rods 21 and 22 respectively pivotally engage openings 23 in the other legs 12a of said members 12 and openings 24 in the plates 8 and 9 whereby the plates 6, 7, 8 and 9 are spaced apart in the same manner substantially equidistantly around the inside of the tire 25 carried by the wheel 5.

The outer ends of groups of cross links 11 are connected to a circumferential chain 26 at the outer side of tire 25 said chain being of sufficient length to permit the use on any size tire and the ends of said chain 26 are connected by a usual tire chain hook 27 whereby the chain is adjustable.

In applying the device to a vehicle tire the rods 21 and 22 are folded up toward rod 17, and the groups of cross links 11 carried by plates 6 and 7 are placed over the tire at its upper portion.

The rods 21 and 22 are then released and drop into position near the lower portion of the tire. It is then only necessary to tighten the circumferential chain and lock by single locking device 27 on the outside of the tire.

This procedure may be used without moving the vehicle wheel or jacking the wheel.

To remove the device from a tire the locking device 27 is opened to permit the circumferential chain to be extended to a loose position which is easily slipped over the tire and by pulling rearwardly on the cross links carried by either plate 6 or 7 the entire device is removed from the tire without the necessity of reaching in back of the wheel.

The channel members 12 prevent outward movement of the rods 21 and 22 from each other as well as the cross link receiving plates.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A collapsible anti-skid device of the character referred to including a pair of cross link receiving plates, a second pair of cross link receiving plates, a foldable frame connecting said plates in spaced apart relationship on the inside of a wheel and including a pair of substantially L-shaped channel members secured at their corners to each of said first named plates and adapted to limit the opening movement of the frame, cross links having one end secured to the plates, and an adjustable circumferential chain on the outside of the wheel and connected to the other ends of said cross links.

2. A collapsible anti-skid device of the character referred to including a pair of cross link receiving plates, means connecting the plates in spaced apart relation, a pair of connector rods pivoted at one end to each of said plates, a second pair of cross link receiving plates at the other end of said rods, said plates adapted for placement on the inside of a wheel, substantially L-shaped channel members carried by the first mentioned plates between which the ends of said rods extend for limiting the opening of said rods, cross links secured at one end to the plates, and an adjustable circumferential chain carried by the outside of the wheel and connected to the other ends of said cross links.

3. An anti-skid device for a wheel comprising a chain for one side of the wheel and having cross chains thereon, plates for the other side of said wheel arranged in pairs, in 90° angular relation around the wheel with said cross chains connected thereto, and means for connecting said plates against movement toward the periphery of said wheel comprising a pair of angle members pivoted at the angles thereof to the plates of one pair for swinging movement alongside said wheel in one direction to move corresponding ends thereof toward each other, rods connecting said members to the other pair of plates to move the same toward each other upon such swinging of said members and thereby tighten said cross chains, and a connection between said members for preventing swinging of the same in the opposite direction.

EDWIN P. HAROLD.

REFERENCES CITED

The following references are of record in the file of this patent:

UNITED STATES PATENTS

| Number | Name | Date |
|---|---|---|
| 1,486,993 | Stolpe | Mar. 18, 1924 |
| 2,176,631 | Kunkle | Oct. 17, 1939 |